Dec. 17, 1935.  C. B. CURTISS  2,024,147
TENSION INDICATOR
Filed March 2, 1931  2 Sheets-Sheet 1
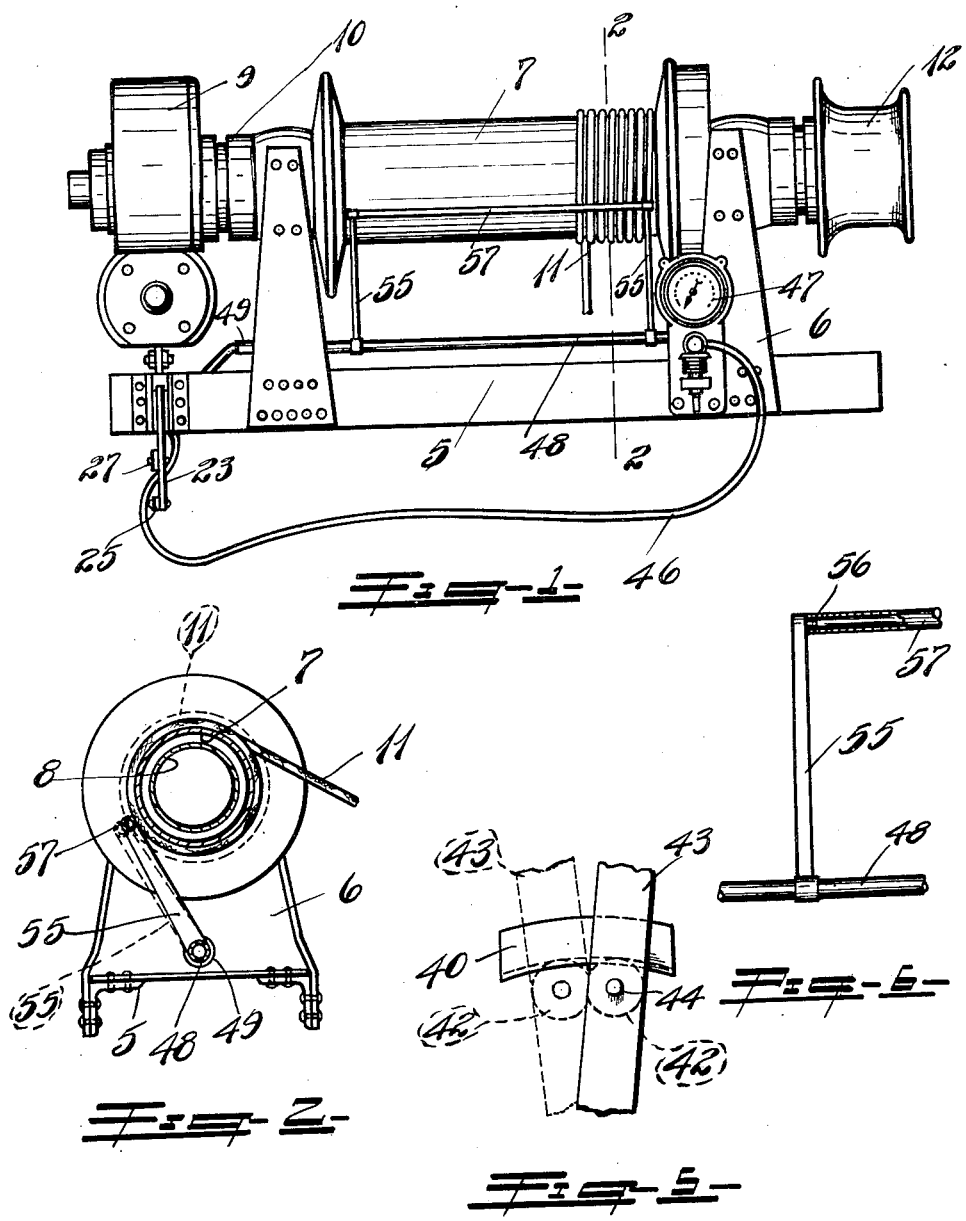
Inventor
Charles B. Curtiss.
By Frank C. Fearman.
Attorney Dec. 17, 1935.    C. B. CURTISS    2,024,147
TENSION INDICATOR
Filed March 2, 1931    2 Sheets-Sheet 2
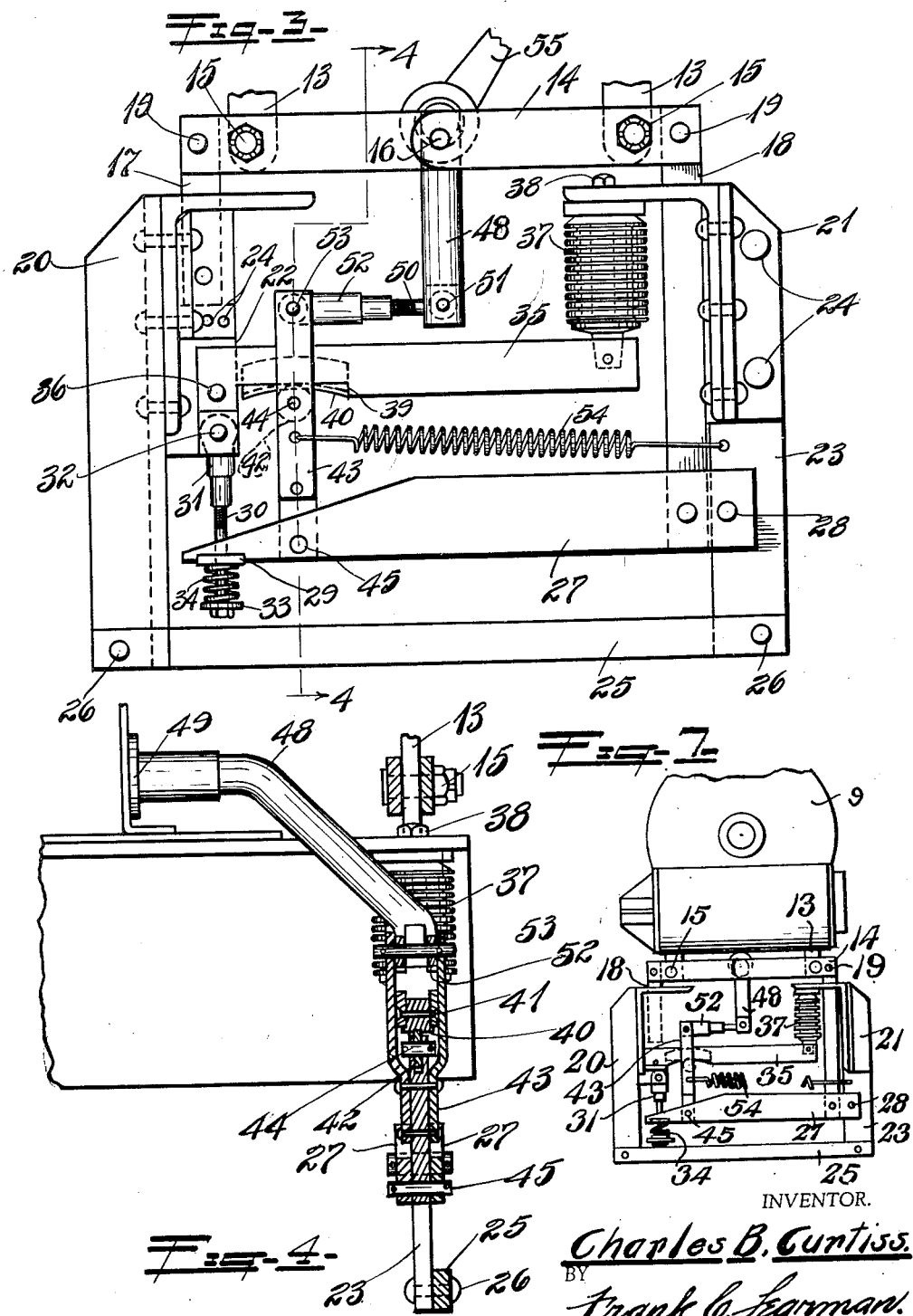
INVENTOR.
Charles B. Curtiss.
BY
Frank C. Fearman.
ATTORNEY.

Patented Dec. 17, 1935

2,024,147

UNITED STATES PATENT OFFICE 2,024,147

TENSION INDICATOR

Charles B. Curtiss, Bay City, Mich.

Application March 2, 1931, Serial No. 519,392

12 Claims. (Cl. 265—25)

This invention relates to tension indicators and more particularly to tension indicators for use in connection with hoisting mechanisms such as used in pulling telephone and telegraph cable and similar equipment, and which is sensitive to load effects, so that the actual rope pull will be measured and indicated, thereby eliminating the possibility of cable damage or breakage due to haphazard pulling, as well as the overloading of the winch.

The prime object of the invention is to provide simple, practical and accurate means built in a winch for measuring and indicating the actual pull on the rope or cable.

Another object is to provide compensating means for correcting the indicator reading when the cable winding radius is increased while the load remains constant.

A further object is to provide a tension indicator which can be readily manufactured and assembled, and which is simple and easy to install.

With the above and other objects in view, the present invention consists in the combination and arrangement of parts, hereinafter described, illustrated in the accompanying drawings, and particularly pointed out in the appended claims, it being understood that changes may be made in arrangement, devices and elements by substituting equivalent mechanisms operating upon the same principles of the mechanism employed, without departing from the spirit of the invention.

In the drawings:

Fig. 1 is a front view of a winch, showing the tension indicator attached thereto.

Fig. 2 is a transverse sectional view taken on the line 2—2 of Fig. 1, the dotted lines showing a second layer or winding of cable.

Fig. 3 is an enlarged view of the linkage mechanism.

Fig. 4 is a sectional edge view taken on the line 4—4 of Fig. 3.

Fig. 5 is a fragmentary view of the link frame, roller track, and roller, the dotted lines illustrating the travel.

Fig. 6 is an enlarged fragmentary view showing the manner of connecting the sleeve to the arms.

Fig. 7 is a view of the linkage mechanism similar to Fig. 3, showing the relation of said mechanism to the worm case.

In general practice it is of course advantageous to know the rope pull or tension exerted on the work being pulled, lifted, or otherwise disposed of, so that the winch may be controlled to eliminate breakage of cable and other equipment, and which may be caused by engaging of the work as well as lack of knowledge of the exerted strain or rope pull of the winch, and I have therefore provided this built-in force measuring and indicating mechanism so that the winch operator, first knowing the safe tensile strain to which the article being pulled can be subjected, can so control the winch that expensive breakage, strains, and repairs can be eliminated, which in turn insures longer lived equipment at a minimum of maintenance cost.

Referring now more specifically to the drawings, the numeral 5 indicates a winch comprising spaced apart end frames 6, in which the drum 7 is journaled, a hollow shaft 8 is journaled in said drum and a floating overhung worm case 9 is mounted on said shaft, a worm and worm wheel, (not shown), being mounted thereon, and a clutch 10 is provided for engaging the worm and the drum, said worm being driven from any suitable source of power, such as the engine of an automotive vehicle, and while the invention is shown mounted on a specific winch, I wish it understood that this application is directed broadly to means for measuring and indicating the rope pull or torque output.

The pulling cable 11 is of course anchored to the drum 7 of the winch, leading thence to the work, and when pulling loads on niggerheads 12, the radius at which the rope pulls is almost constant, with the result that an indication of the torque on the worm case will give a proper measurement or reading which can be calibrated to indicate the direct rope pull, this also holds true when pulling on the winch drum, where the drum diameter is uniform and on the first winding across, after which a different result would be obtained, inasmuch as a given load will impose a torque on the worm case proportional to the radius at which the rope is pulling, measured from the center line of the shaft, thus as the rope winds on the drum over the first winding, the apparent load as indicated by the gauge or indicator would increase, even though the actual load remained constant, which of course would be due to the increase in radius at which the rope would be pulling, and I have therefore designed a means for compensating for this varying radius, so that as the radius at which the rope pull is increased, the torque of the worm case, which would be in proportion to that radius, would be reduced in its effect, keeping substantially a constant pressure on the hydraulic system.

As above mentioned, the worm case is overhung on the shaft and is non-load supporting as it merely houses the usual worm and worm wheel, spaced apart ears 13 being provided on the bottom thereof, and torque bars 14 are secured to said ears by means of bolts 15, the inner ends of the bars being connected by the pin 16 and the linkage for measuring the rope pull or torque output of the winch is attached to one of the outer ends thereof.

Downwardly depending links 17 and 18 respectively are connected to the torque bars by means of pins 19, said links projecting through suitable openings provided in the winch frame, angles 20 and 21 respectively being secured to the sides of the frame, and bars 22 and 23 are interposed between said angles and are secured thereto by means of rivets 24, a bar 25 connecting the lower ends thereof, and rivets 26 secure said bar in position, and while I have shown this frame constructed of angles and bars, it will be understood that it can be of any desired construction.

Horizontally disposed bars 27 are connected to the member 23 by means of the pin 28, a clip 29 being provided on the free ends and an adjustable bolt 30 projects through said clip and is threaded into a socket 31, which is in turn pivotally connected to the bar 22 by means of the pin 32, a washer 33 being provided as shown, and a spring 34 is interposed between the washer and the clip, this mechanism serving to support the outer end of the bars 27 and to relieve the measuring mechanism of any drag.

Bar members 35 are pivotally connected to the side frame at the point 36, the opposite end being connected to a yieldably resisting member which in the present instance is a conventional copper bellows 37, which is secured on the winch frame by means of the cap screw 38, said bars being cut away as at 39 and a roller track 40 is secured thereto by means of the rivet 41. A roller 42 engages said track and is revolubly mounted in the link frame 43 by means of the pin 44, said link frame being pivotally connected to the horizontal bars 27 by means of the pin 45. It will be obvious that the cable pull on the winch drum will tend to rotate the worm case, exerting an upward force on the link 18 which will in turn force the bars 35 upwardly and actuate the copper bellows. A tube 46 is connected to the copper bellows in the usual manner, thence leading to a force measuring instrument 47 which is mounted on the winch frame or other suitable support and on which the cable pull will be indicated.

As previously referred to, a suitable compensating mechanism must be provided to compensate for the varying winding radius, and I have therefore provided a longitudinally disposed hollow shaft 48 mounted in bearings 49 provided in the end frames, one end of said shaft being bent as shown in Fig. 4 of the drawings, the end being bifurcated and is connected to an eye bolt 50 by the pin 51, the opposite end of the eye bolt being threaded into a socket 52, which is pivotally connected to the link assembly 43 by the pin 53, said shaft being held in proper position against the cable by means of a spring 54 anchored to the members 43 and 23 respectively.

Arms 55 are mounted on the shaft 48 in spaced apart relation, and laterally projecting pilots 56 are cast integral therewith and on which a pipe sleeve 57 is revolubly mounted for eliminating friction, and it will be obvious that as the radius at which the rope is pulling (measured from the centerline of the shaft) increases, the sleeve 57 will be forced outwardly, rocking the shaft 48 and shifting the position of the link assembly 43 to cause the point of contact of roller 42 with track 40 to move toward the pivot 36 of lever 35 to thereby compensate for the varying radius.

When the cable winds on the drum over the first winding, the winding radius is increased, and assuming that the load is constant, suitable compensating means must be provided, and this includes the arm 48, which is actuated by the sleeve 57; this shifts the link assembly 43 to compensate for the additional torque resulting from the increase in radius at which the cable is pulling.

From the foregoing description it will be obvious that I have perfected a simple, practical and accurate measuring and indicating mechanism for measuring the cable pull.

What I claim is:

1. The combination with a winch mechanism having a rope anchored thereto and to the work, a worm case carrying the driving worm of the mechanism and pivoted on the drum shaft, torque bars connected thereto at spaced apart points, a pull measuring and indicating means mounted on the winch frame, bars connected to the frame and pull measuring means respectively, including a horizontally disposed bar connected to the frame, a link connecting said bar and torque bars, a link assembly connected to the horizontally disposed bar and engaging another of said bars connecting the frame and measuring means to actuate said measuring means, and means connected to said link assembly and engaging the rope on the drum for maintaining constant the indicator reading when the rope winding radius is changed.

2. The combination with a hoisting mechanism including a frame and a drum and having a rope anchored to the drum and to the work, a worm case cradled on the drum shaft, of a force measuring and indicating means mounted on the frame, torque bars connected to the worm case, a load responsive flexibly interconnected linkage pivotally mounted on the frame and connected to the torque bars and to the force measuring and indicating means respectively, said linkage being actuated by movement of said torque bars for measuring and indicating the rope pull as the hoisting mechanism is operated, said linkage including means for varying the effect thereof on said indicating means when the rope winding radius is varied.

3. The combination with a hoisting mechanism having a frame and a drum and having a rope anchored to the drum and to the work, a worm case cradled on the drum shaft, of a force measuring and indicating mechanism mounted on the frame of the mechanism, a flexible interconnected linkage also mounted on said frame and connected to the force measuring means and to the worm case respectively for actuating said measuring means for indicating the rope pull on the indicating mechanism, said linkage including means for varying the effect thereof on said indicating means when the rope winding radius is varied.

4. The combination with a hoisting mechanism including a frame and a drum and having a rope anchored to the drum and to the work, a worm case cradled on the drum shaft and carrying a driving worm of said hoisting mechanism, of a force measuring and indicating mechanism, an interconnected linkage mounted on the frame and connected to the force measuring means and worm case respectively for actuating said force measuring means when the work load is varied, and adjustable compensating means connected to said linkage for maintaining constant the indicator reading when the rope winding radius is changed and the work remains constant.

5. The combination of a winch mechanism including a frame and a drum, and having a rope anchored to the drum and to the work, a worm case cradled on the drum shaft and carrying a driving worm of said winch mechanism, torque bars connected to the worm case at spaced apart points, a force measuring mechanism, a flexible interconnected linkage pivotally mounted on the frame and connected to the torque bars and to the force measuring mechanism respectively, for indicating the rope pull on the force measuring mechanism as the winch mechanism is operated, said linkage including means for varying the effect thereof on said measuring means when the rope winding radius is changed.

6. The combination with a winch mechanism including a frame and a drum, and having a rope anchored to the drum and to the work, a worm case cradled on the drum shaft, torque bars connected to the worm case at spaced apart points, of a yieldable resisting member mounted on the winch frame and having an indicator connected thereto, and a linkage pivotally mounted on the frame and connected to the torque bars and to the yieldable resisting member respectively, for actuating said yieldable resisting member to indicate the rope pull on the indicator when the winch is operated.

7. The combination of a winch mechanism including a frame and a drum, and having a rope anchored to said drum and to the work, a worm case cradled on the drum shaft, a force measuring mechanism, torque bars connected to the worm case, a load resopnsive linkage pivotally mounted on the frame and connected to said torque bars and to the force measuring mechanism respectively for indicating the rope pull on the force measuring mechanism as the winch mechanism is operated.

8. The combination with a winch having a frame and a drum, a rope anchored to the drum and to the work, a worm case cradled on the drum shaft, torque bars pivotally connected to the worm case at spaced apart points, of a yieldable resisting means mounted on the winch frame and having a force measuring mechanism connected thereto, horizontally disposed bars connected to said mechanism and to the winch frame, a link assembly, one end being connected to the frame, with the opposite end in engagement with said horizontally disposed bars, adjustable means for supporting the link assembly, and a link connecting said torque bars and the link assembly for actuating the yieldable resisting means to measure the rope pull as the winch is operated.

9. The combination with a winch provided with a frame and a drum, and having a rope anchored to the drum and to the work, a worm case cradled on the drum shaft and carrying a driving worm of said winch, of a yieldable resisting means mounted on the winch frame, and a force registering means connected thereto, flexible interconnected linkage pivotally mounted on said frame, one end being connected to said worm case, the opposite end being connected to said yieldable resisting means, and adjustable means connected to said linkage and engaging the rope wound on the drum for maintaining constant the reading of the force measuring means when the rope winding radius is changed.

10. The combination of a winch mechanism including a frame and a drum, and having a rope anchored to the drum and to the work, a worm case cradled on the drum shaft and carrying a driving worm of said winch, torque bars connected to the worm case at spaced apart points, a yieldable resisting member, a load responsive linkage pivotally mounted on the frame and connected to said torque bars and to the yieldable resisting member respectively, and a force measuring mechanism connected to said yieldable resisting member for measuring the rope pull as the winch mechanism is operated.

11. A tension indicating mechanism including a winch provided with a frame and a drum, a rope anchored to the winch and to the work, a worm case cradled on the drum shaft and carrying a driving worm of said winch, torque bars connected to the worm case at spaced apart points, a force measuring mechanism, and a compound lever linkage connected to said torque bars and to the force measuring mechanism respectively, for measuring the load on the rope and on the winch when said winch is operated.

12. A tension indicating mechanism including a winch having a frame and a drum, a rope wound on the drum and anchored to the work, a worm case cradled on the drum shaft and carrying a driving worm of said winch, torque bars connected to the worm case at spaced apart points, a yieldable resisting member, a force measuring mechanism connected thereto, and a load responsive linkage pivotally mounted on the frame and connected to said torque bars and yieldable resisting member respectively for measuring the load on the winch when the mechanism is operated.

CHARLES B. CURTISS.